E. S. MacPHERSON.
VALVE MECHANISM.
APPLICATION FILED SEPT. 5, 1916.

1,227,812.

Patented May 29, 1917.
2 SHEETS—SHEET 1.

Witness
E. R. Barrett

Inventor
Earle S. MacPherson,
By Pagelsen & Spencer,
Attorneys

UNITED STATES PATENT OFFICE.

EARLE S. MacPHERSON, OF DETROIT, MICHIGAN, ASSIGNOR OF ONE-HALF TO CHARLES L. NEDOMA, OF DETROIT, MICHIGAN.

VALVE MECHANISM.

1,227,812.  Specification of Letters Patent.  Patented May 29, 1917.

Application filed September 5, 1916. Serial No. 118,363.

*To all whom it may concern:*

Be it known that I, EARLE S. MACPHERSON, a citizen of the United States, and residing at Detroit, in the county of Wayne and State of Michigan, have invented a new and Improved Valve Mechanism, of which the following is a specification.

The present invention relates to valve actuating mechanism which, although of application generally in fluid operated motors and in compressors, is particularly suitable for use in connection with high speed internal combustion engines, and its object is to provide inexpensive means whereby the valve is both opened and closed positively and noiselessly, and whereby breakage, incident to present constructions, is largely avoided.

In order to insure the return of engine valves to their seats, it is customary to employ between the valve stem and the stem actuating element a spring which is compressed by the opening action of the cam by which the particular valve is operated—this construction is, however, objectionable due to the fact that at high speeds the spring lags behind the cam mechanism (because of the inertia of the valve and valve stem and the other resistances offered to the movement thereof) and is a source of noise. The construction, it will also be noted, does not positively return the valve to its seat; that is, the valve is returned through the action of the force stored in the spring and not by means of a force applied by the cam or other positive actuating means. The amplitude of vibration is, therefore, equal to or greater than the movement of the valve, which gives rise to crystallization and fatigue.

On the other hand, the present invention comprises means whereby the valve is positively seated as well as unseated and whereby allowance is made for inaccuracies and expansion of the cams; also whereby proper assurance is given of final seating of the valve without the use of resilient means of such nature as to be liable to breakage due to crystallization. One feature of the invention resides in the use of valve returning means which includes a spring that moves bodily with the particular element or elements with which it is associated, whereby flexibility is insured at all times although the deflection of the spring is very slight. The full nature of the invention will be more fully understood from the following detailed description.

Figure 1:
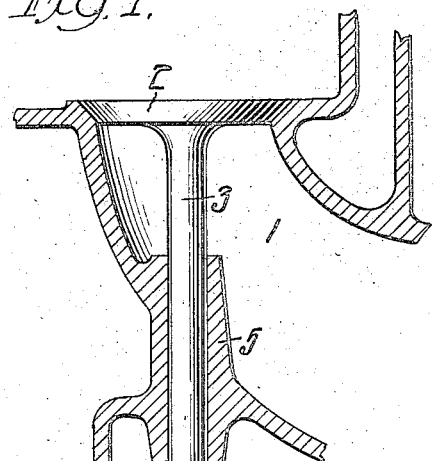
Figure 3:
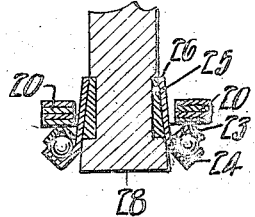
Figure 2:
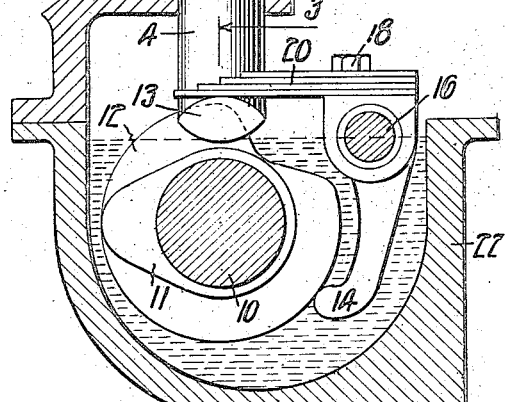
Figure 2:
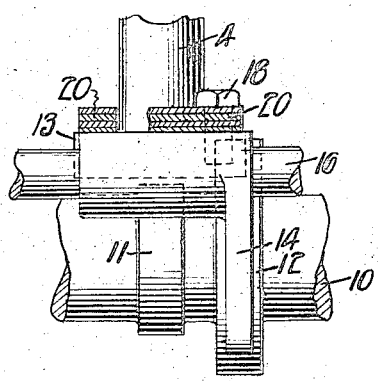

In the drawings, which illustrate the application of the invention to the puppet valves of an internal combustion engine, Figure 1 is a transverse vertical section of a preferred embodiment. Fig. 2 is a fragmentary side view corresponding thereto. Fig. 3 is a section of a modification taken on the line 3—3 of Fig. 1. Figs. 4, 5, 6, 7 and 8 are sections, similar to Fig. 1, illustrating other embodiments of the invention.

Like reference characters indicate like parts.

The usual intake or exhaust passage 1, the port of which is closed by the valve 2, which may be of the puppet variety, is indicated in Fig. 1; its stem or push-rod preferably includes an upper portion 3 and a lower portion 4, which pass, respectively, through suitable guides 5 and 6, and are in threaded connection with one another for adjustment purposes, a lock-nut 8 serving to retain them in adjusted position.

Associated with the portion 4 of the valve stem is a cam shaft 10 which includes or has rigid therewith two cams 11 and 12 with which are respectively associated the cam followers 13 and 14, the former being rigid with the stem section 4 and having arcuate upper and lower surfaces, whereas the latter is rigid with a tiltable shaft or pivot 16. Also projecting preferably at substantially right angles to the follower 14 and secured to said follower or to the shaft 16 by any suitable means such, for example, as the set-screw 18, is a leaf spring 20, the outer end of which is divided and bears upon the upper arcuate surfaces of the follower 13. The cam 11 may be regarded as of positive contour whereas the cam 12 is negative in respect thereto; in other words, when the cam 11, acting on the lower arcuate surface of the cam follower 13, tends to force the latter upwardly a given increment or distance, the cam 12 is in such position with reference to the follower 14 as to allow the end of the spring 20 to rise an equal amount; and, likewise, the rate at which the cam 12 in its contact with the follower 14 tends to force the follower 13 downwardly is equal to the rate at which the latter is allowed such movement by the cam 11. A slight clearance is allowed between the cam 11 and the follower 13, the parts being inclosed in a suitable casing 22 which is filled with oil to a level such that the opposed surfaces are submerged, at least until they come into actual contact with one another. The film of oil above the cam 11 effectually prevents noise as the latter engages the follower 13 at the beginning of the unseating action.

It will be understood that the spring 20 is stiff and is initially so set as to tend to draw the valve downwardly a very short distance after the cam 12 has positively drawn said valve downwardly into close proximity to the seat, whereby the final close seating of the valve is insured and a quick positive action in drawing the valve downwardly is obtained—at the same time, allowance is made for inaccuracy in and expansion of the cams as well as for grinding of the valves and valve seats. As the movement of the end of the spring, due to its resiliency, is very small, substantially no tendency to crystallization or fatigue exists.

In Fig. 3 the spring 20 bears on the upper race 23 of a ball bearing, the lower race 24 of which is continued upwardly in conical form at 25 to inclose a divided sleeve 26 which is seated in a circumferential groove cut in the lower end of the valve stem or cam follower. The lower surface 28 of said follower is preferably flat to receive the cam 11. This construction allows ready rotation of the valve about its own axis whereby a better seating action and more uniform wear is secured.

Figure 4:
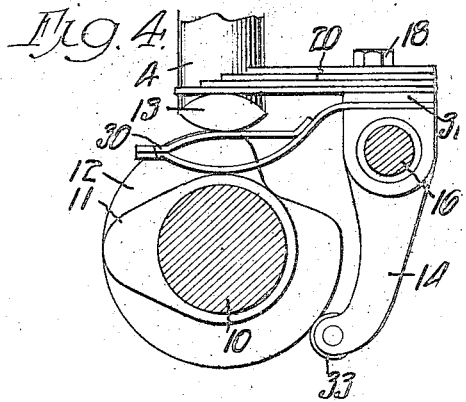

In the construction shown in Fig. 4, the clearance between the cam 11 and follower 13 is increased and a spring 30 of less strength than the spring 20 is interposed. It will be seen that all coöperating parts are in constant contact, and that the valve is seated by the surplus of tension in the spring 20 over that which exists in the spring 30. A thin shim 31 which is preferably used between the springs 20 and 30 may be removed to compensate for grinding, it being possible to thus make the valve stem in a single piece. In this instance, the follower 14 is shown provided with a roller 33 which may, of course, be employed in any of the other embodiments.

Figure 5:
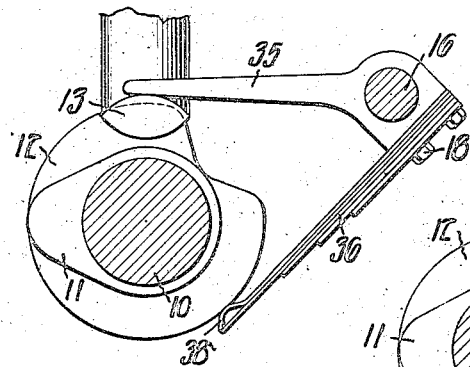

In Fig. 5 the parts may be said to be reversed, the follower arm 35 which bears upon the upper surface of the follower 13 being rigid and the rigid arm 14 being replaced by a resilient arm 36, preferably a leaf spring. The latter is also preferably formed at its outer end with a relatively weak leaf element 38 by which the final seating of the valve, as well as accommodation to variations in the cam 12, is secured. As soon as this element is compressed the positive return of the valve takes place through the stiffer portion of the spring.

Figure 6:
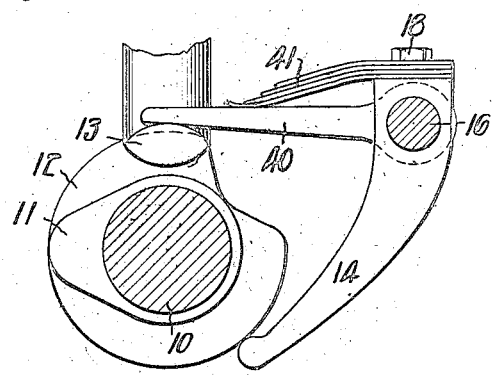

Fig. 6 corresponds closely to Fig. 1, the difference being that a rigid arm 40, having pivotal movements with relation to the follower 14, is interposed between the upper surface of the follower 13 and the spring 41, which corresponds to the spring 20.

Figure 7:
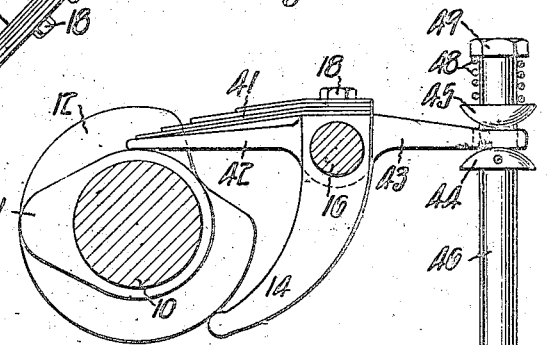
Figure 8:
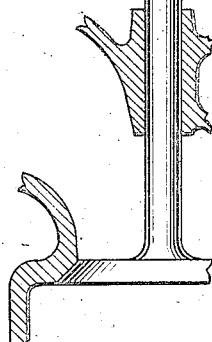
Figure 8:
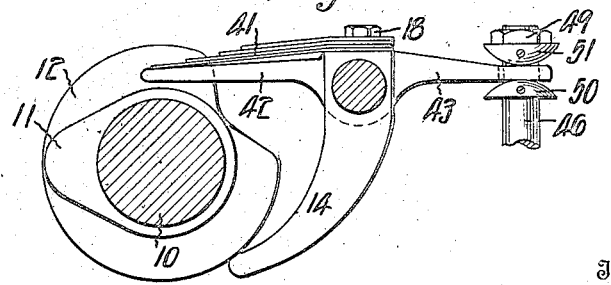

In Fig. 7, the arm 42, which replaces the arm 40 of Fig. 6, is continued on the opposite side of the shaft 16, as indicated at 43, and has a divided end received between the fixed and movable collars 44 and 45 on the valve stem 46. The former is backed by a helical spring 48 which is seated against a nut 49 on the stem. In operation the spring 41 holds both arms 14 and 42 in constant engagement with the cams and the relatively weaker spring 48 causes a final seating of the valve. Fig. 8 differs from Fig. 7 in that both collars 50 and 51 are rigid with the stem 46 in which case a sufficient clearance is allowed between the follower arm 42 and the cam 11 to insure seating of the valve through the action of the spring 41.

It is obvious that variations in the construction, other than those indicated, may be made; I do not, therefore, wish to be limited except as indicated by the subjoined claims.

I claim:—

1. In combination with a valve and a seat therefor, valve operating mechanism comprising cam means including positive and negative cam surfaces, follower means for the cam surfaces operatively connected to said valve, said follower means including two arms, one for each surface, that are mounted to swing about a single axis and are resiliently urged toward the corresponding cam surface.

2. In combination with a valve stem, a valve and a seat for the latter, valve operating mechanism comprising a cam and cam follower means mounted to swing about a single axis and co-acting with the valve stem to force the valve positively to its seat, said cam-follower means including a stiff resilient bodily movable element through which the force for seating the valve is transmitted.

3. In combination with a valve stem, a valve and a seat for the latter, valve operating mechanism comprising cam means having positive and negative cam surfaces and two followers, one for each surface, arranged to move the valve and valve stem in opposite directions, one of the followers having a slight clearance from the corresponding cam surface when the valve is being moved by the other, the other follower including a resilient member whereby the first named follower is constantly urged toward the corresponding cam.

4. In combination with a valve stem, a valve and a seat for the latter, valve operating mechanism comprising a cam and movable cam follower means coacting with the valve stem to force the valve positively to its seat, said cam follower means including resilient pivotally mounted bodily movable means having a portion of relatively greater stiffness and another portion of relatively lesser stiffness through which the force for sealing the valve is transmitted.

5. In combination with a valve and seat and a valve stem, valve operating mechanism for the valve comprising cam means including positive and negative cam surfaces, a follower including a portion arranged to engage the positive cam surface to move the valve in one direction, another follower including a portion adapted to engage the negative surface to move the valve in another direction, said followers together including a bodily movable stiff leaf spring arranged at an angle to the valve stem whereby they are constantly urged toward the corresponding cam surfaces.

6. In combination with a valve stem, a valve and a seat for the latter, valve operating mechanism comprising cam means having positive and negative cam surfaces and two followers, one for each surface, arranged to move the valve and valve stem in opposite directions, one of the followers having a slight clearance from the corresponding cam surface when the valve is being moved by the other, the other follower including a resilient member whereby the valve is resiliently forced to its seat when the first mentioned follower is out of contact with the corresponding cam.

7. In combination with a valve and a valve seat, cam means having positive and negative cam surfaces, a rigid valve stem including a follower for one of the cam surfaces whereby the valve is positively unseated by an uncushioned stress, another follower co-acting with the other cam surface and with the valve stem, said last named follower including a bodily movable resilient element whereby close engagement of the valve with the seat is insured, there being a slight clearance between the first mentioned follower and the corresponding cam, and a casing adapted to contain lubricant whereby the opposed surfaces of the followers and cams may be submerged.

8. In combination with a valve and seat and a valve stem, valve operating mechanism for the valve comprising cam means including positive and negative cam surfaces, a follower including a portion arranged to engage the positive cam surface to move the valve in one direction, another follower including a portion adapted to engage the negative surface to move the valve in another direction, said followers together including a stiff spring arranged at an angle to the valve stem whereby they are constantly urged toward the corresponding cam surfaces.

9. In combination with a valve and seat, valve operating mechanism for the valve comprising cam means including positive and negative cam surfaces, a follower arranged to engage one of the cam surfaces to move the valve in one direction, another follower arranged to engage the other cam surface to move the valve in another direction, said last mentioned follower including two arms extending at an angle to each other and mounted to swing about a common pivotal axis, one of the arms including a resilient element whereby both followers are urged toward the corresponding cam surfaces.

10. In combination with a valve and valve seat, a stem for the valve including two adjustably and rigidly connected rigid sections, cam means comprising positive and negative cam surfaces, one of the valve stem sections having rigid therewith a follower arranged to co-act with one of the cam surfaces to be moved in one direction thereby to unseat the valve, and another follower co-acting with the other cam surfaces to move the valve stem in the opposite direction to seat the valve, said last mentioned follower including a bodily movable resilient element whereby the final seating of the valve is insured.

11. In combination with a valve and valve seat, a stem for the valve including two adjustably and rigidly connected rigid sections, cam means comprising positive and negative cam surfaces, one of the valve stem sections having rigid therewith a follower arranged to co-act with one of the cam surfaces to be moved in one direction thereby to unseat the valve, and another follower co-acting with the other cam surfaces to move the valve stem in the opposite direction to seat the valve, said last mentioned follower including a bodily movable resilient element whereby the final seating of the valve is insured, and said first mentioned follower being spaced slightly from the corresponding cam surface when said valve is seated.

12. In combination with a valve stem, a valve and a seat for the latter, valve operating mechanism comprising a cam and pivotally mounted cam follower means co-acting with the valve stem to force the valve positively to its seat, said valve stem being rotatable about its own axis, said cam-follower means including a stiff resilient bodily movable element through which the force for seating the valve is transmitted.

13. In combination with a valve stem, a valve and a seat for the latter, valve operating mechanism comprising a cam and pivotally mounted cam follower means coacting with the valve stem to force the valve positively to its seat, said cam-follower means including resilient bodily movable means having a portion of relatively greater stiffness and another portion of relatively lesser stiffness through which the force for sealing the valve is transmitted.

EARLE S. MacPHERSON.